Feb. 6, 1945.  W. TIDDY  2,368,901
AMMONIUM SULPHATE PRODUCTION
Filed Sept. 25, 1940  3 Sheets-Sheet 2
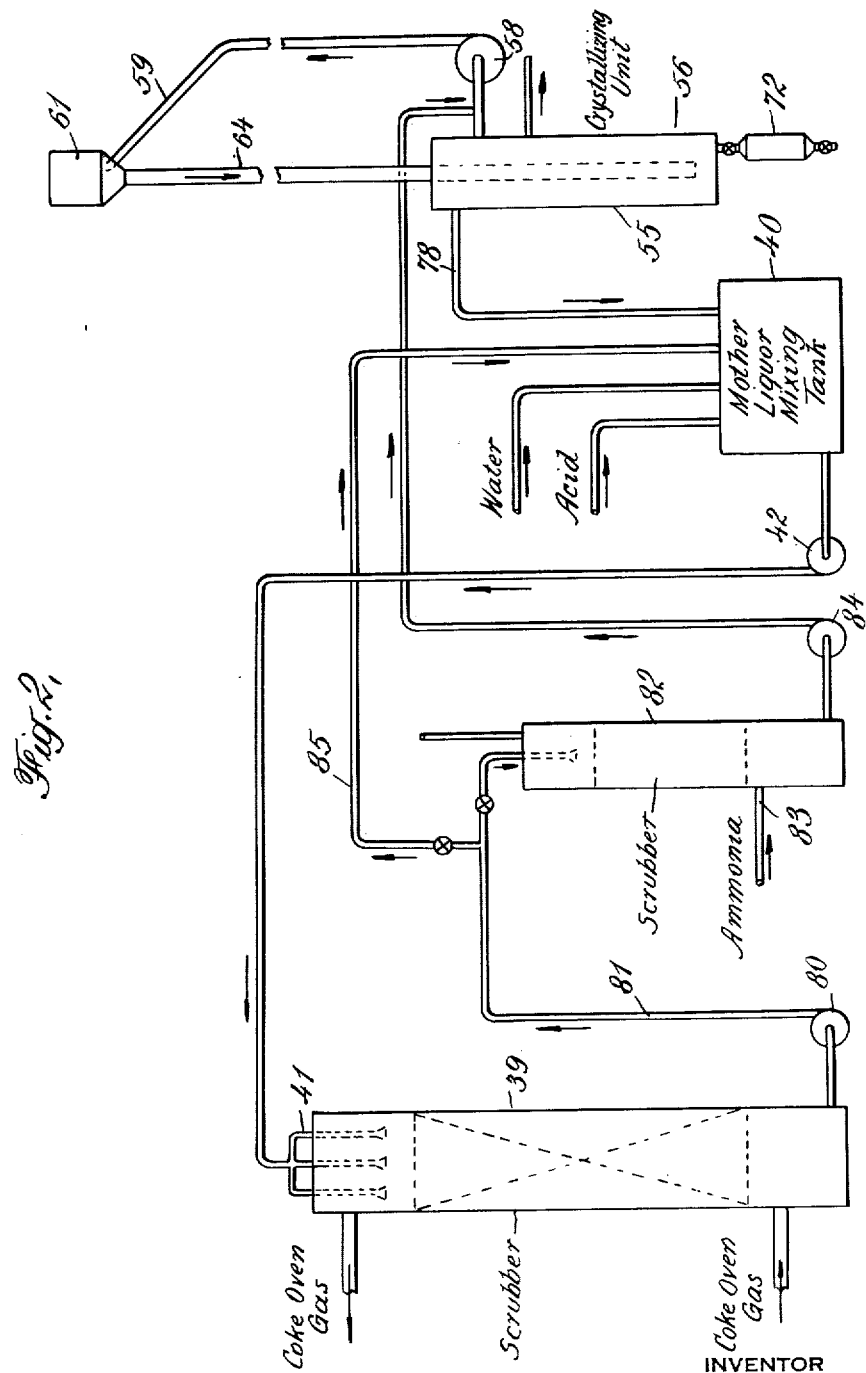
INVENTOR
William Tiddy
BY Gordon A. Wilkins
ATTORNEY

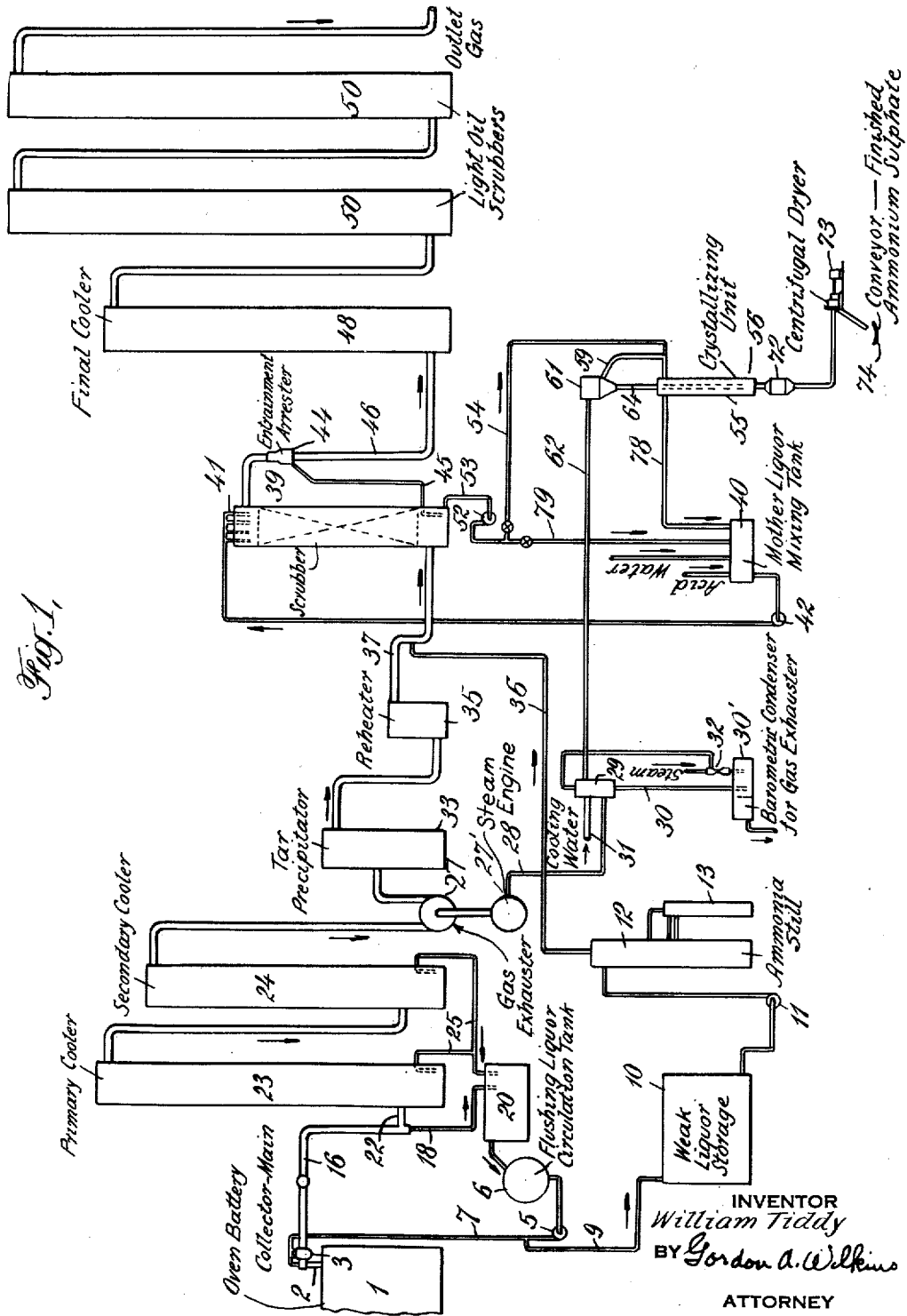

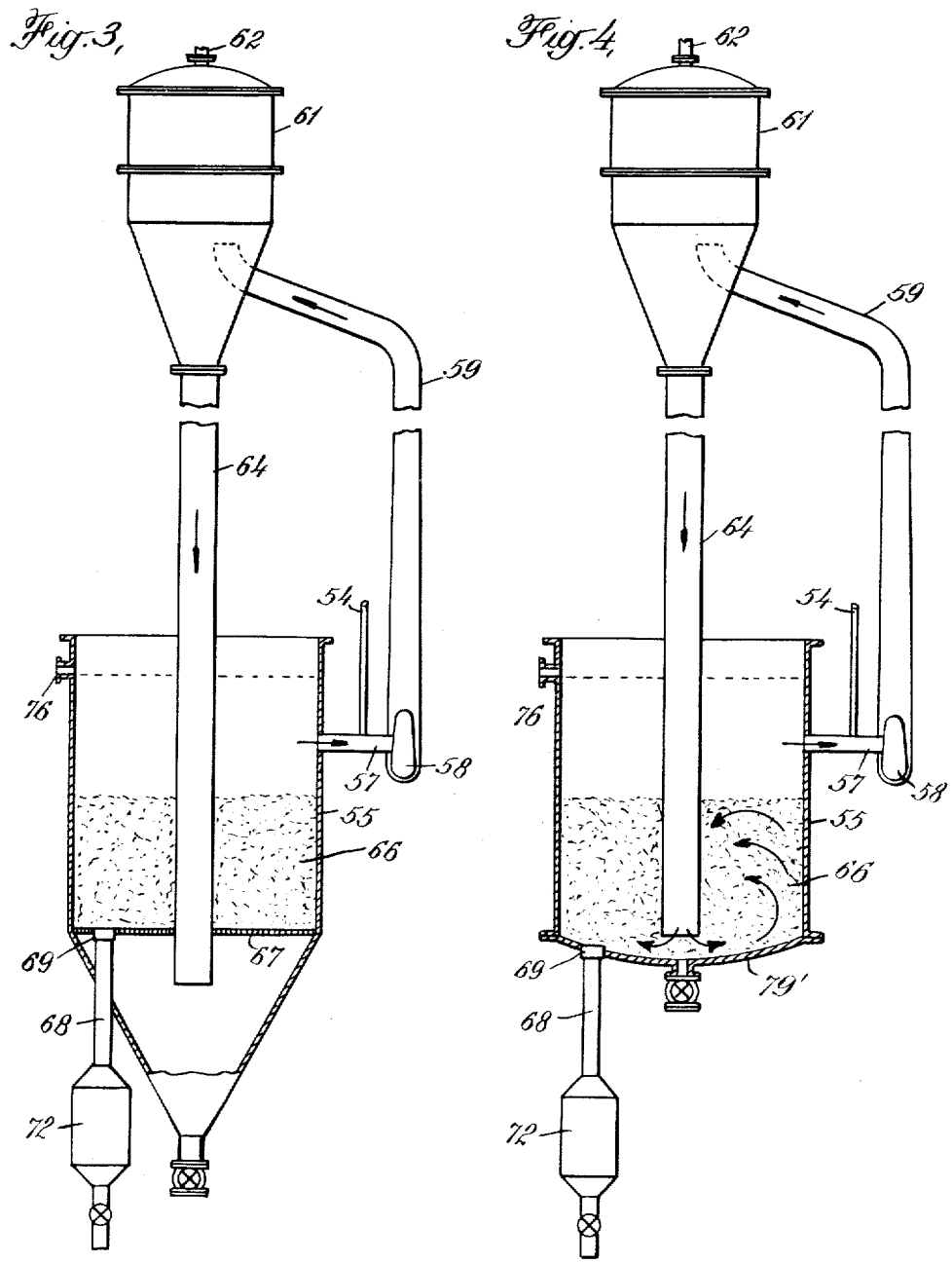

Patented Feb. 6, 1945

2,368,901

UNITED STATES PATENT OFFICE 2,368,901

AMMONIUM SULPHATE PRODUCTION

William Tiddy, New York, N. Y., assignor to Semet-Solvay Engineering Corporation, New York, N. Y., a corporation of New York Application September 25, 1940, Serial No. 358,233

10 Claims. (Cl. 23—119)

This invention relates to the simultaneous production of ammonium sulphate and removal of ammonia from ammonia-containing gases and more particularly to the manufacture of ammonium sulphate from coke oven gas.

Heretofore in the manufacture of ammonium sulphate from coke oven gas, it has been customary to draw the gas by means of an exhauster through one or more packed cooling columns, the gas then being forced by the exhauster through a saturator containing a relatively deep body of sulphuric acid where the ammonia present in the gas reacts with the acid to form ammonium sulphate which separates from the solution in the form of small crystals; the ammonium sulphate crystals are removed from the saturator and are dried, e. g., by centrifuging them. Such procedure is subject to the disadvantage that it involves relatively high power costs to force the gas through the saturator, i. e., to overcome the back pressure in the gas lines caused by the high liquid head in the saturator. An even greater disadvantage of the prior art process is that the ammonium sulphate crystals are of small size and owing to their fine character have a tendency to cake when stored. For most purposes a free flowing ammonium sulphate product is desired, particularly when it is to be fed as a stream or scattered, e. g., when it is used for fertilizing purposes. The caking tendency of finely divided ammonium sulphate has long been recognized and many prior art attempts have been made to improve the free flowing properties of the product, e. g., it has been proposed to add various chemicals to ammonium sulfate solutions in an effort to improve the size and shape of the crystals obtained therefrom.

Coke oven engineers generally have been of the view that it is not economical to scrub coke oven gas with sulphuric acid solution in a scrubber which exerts substantially less back pressure on the coke oven gas flow than the usual ammonium sulphate saturator and then to crystallize the ammonium sulphate from the solution by evaporation because the cost of evaporation required to effect the necessary concentration more than offsets the saving effected by using a scrubber in lieu of the ammonium sulphate saturator for recovering ammonia from coke oven gas.

It is an object of this invention to provide a novel and improved process and apparatus for the production of crystalline ammonium sulphate recovered from combustible or inert gases containing ammonia.

It is another object of the invention to provide an improved process for the manufacture of large size ammonium sulphate crystals recovered from coke oven gas or other inert gases containing ammonia.

It is a further object of the invention to provide a novel process of producing an improved ammonium sulphate product from coke oven gas at lower cost than has heretofore been possible. Other objects and advantages will appear hereinafter.

In accordance with the invention conditioned coke oven or other inert gas containing ammonia is passed upwardly through a packed scrubbing column countercurrent to a descending solution containing free sulphuric acid and ammonium sulphate, thereby effecting intimate contact between the solution and the gas, and the resultant ammonium sulphate solution is subjected to evaporative cooling under vacuum to supersaturate it with respect to ammonium sulphate and is then passed into contact with a bed or suspension of ammonium sulphate crystals whereby ammonium sulphate crystallizes from the solution onto the surface of the crystals so that large crystals are formed. The larger crystals settle to the bottom of the suspension and may be removed continuously or from time to time. For example, in carrying out the invention with coke oven gas, it is drawn by an exhausting pump through the usual coke oven battery collector main where the gas is sprayed with weak ammonia liquor to remove a portion of the ammonia and through cooling towers where the gas is cooled, passed through a tar extractor to effect removal of tar, and is reheated to a temperature between 35° and 60° C., e. g., from a temperature of about 25° C. If the gas is low in saturation, exhaust steam is added to maintain a humidity of at least 70 per cent of saturation to avoid excessive evaporation or concentration of solution in the scrubbing column. The gas is then forced by the exhauster upwardly through a scrubbing column countercurrent to a descending solution of ammonium sulphate and sulphuric acid at a temperature of from 35° to 65° C., preferably 50° to 60° C. leaving the column, to absorb the ammonia present in the gas with the sulphuric acid. The solution preferably contains from about 10 to 50 grams of sulphuric acid per liter and from 40 to 45 per cent by weight of ammonium sulphate. All or a part of the ammonium sulphate solution from the scrubbing column is cooled and concentrated by evaporation under vacuum, as hereinabove described, to supersaturate it with respect to ammonium sulphate and passed into contact with a suspension of ammonium sulphate crystals in a crystallizing chamber whereby large size crystals are formed. The sulphuric acid and ammonium sulphate concentration of the liquor from the crystallizing chamber is brought within the desired limits in the mixing tank and the resultant solution recirculated through the scrubbing column into contact with additional coke oven gas. If desired, the ammonia and steam obtained by treating the weak ammonia liquor from the collector main in the usual ammonia still equipped with a fixed lime leg may be mixed with the coke oven gas prior to entering the scrubbing column or may be passed through a second scrubbing column countercurrent to the solution from the first column to neutralize the residual sulphuric acid in the solution. It will be appreciated that the steam present in the ammonia from the still at least partially raises the humidity of the gas to the desired extent.

Since much less pressure is required to force the coke oven gas through scrubbing columns than through the usual saturator in which the ammonia present in the gas is reacted with sulphuric acid, less power, e. g., steam to operate the customary exhauster pump, is required to feed the gas through the equipment in accordance with this invention. Accordingly, when the steam-driven unit driving the exhauster is operated condensing and the exhaust steam from the unit is condensed in the customary barometric condenser, less condensing capacity is required and the excess capacity of the condenser is made available for use in maintaining a vacuum for the evaporative cooling of the ammonium sulphate solution during the crystallizing step; e. g., where as is usually the case, the exhauster is driven by a condensing steam engine discharging exhaust steam into a barometric condenser, the condenser is placed in communication with an evaporative cooling chamber containing the ammonium sulphate solution so that the excess capacity of the condenser is employed to effect crystallization of the ammonium sulphate. Thus standard coke oven gas exhausting equipment may be employed and a saving in costs effected by utilizing the excess capacity of the equipment to aid in crystallizing the ammonium sulphate.

In accordance with the invention, improved ammonium sulphate crystals having less tendency to cake on storage are obtained than are produced by the usual procedure involving passing ammonia containing coke oven gas through a saturator. For example, crystals of average dimensions of 1.1 mm. diameter by 1.5 mm. length are obtained as compared with crystals of an average size of 0.2 mm. diameter by 1.0 mm. length produced by the usual saturation process. Furthermore, the crystals are of more uniform size than those obtained by the saturator process.

The invention may be employed for the removal of ammonia from other gases containing the same, for example, from mixtures produced by distilling ammonia from a solution thereof and mixing the ammonia with a combustible or other gas substantially inert with respect to ammonia and sulphuric acid. By the expression "inert gas" as used herein is meant gases which are inert toward sulphuric acid and ammonia under the conditions under which the invention is carried out.

For a more complete understanding of the invention, reference may be had to the accompanying drawings, in which, Figure 1 is a diagrammatic view showing one form of apparatus for carrying out the invention in combination with conventional coke oven equipment.

Figure 2 is a diagrammatic fragmentary view illustrating another embodiment of the invention.

Figure 3 is a partial sectional view on an enlarged scale showing one form of crystallizing apparatus which may be employed, and Figure 4 is a view similar to Figure 3 showing another form of crystallizing apparatus.

In the drawings reference numeral 1 designates generally any well known by-product coke oven battery which may be of the horizontal type having uptake pipes 2 through which gas flows from the individual coking chambers to collector main 3 equipped with a plurality of sprays (not shown) supplied with ammonia liquor pumped by pump 5 from tank 6 through conduit 7. A portion of the weak liquor flows from pump 5 through conduit 9 to storage tank 10 from which it may be pumped by pump 11 to ammonia still 12 equipped with fixed lime leg 13 for freeing the ammonia from the liquor in a manner well known in the coke oven art.

The weak ammonia liquor collecting in the collector mains 3 flows through pipes 16 and 18 to decanter 20 in which tar is separated from the liquor and from which the liquor flows to tank 6. Coke oven gas likewise flows through pipe 16 and leaves the latter through offtake pipe 22 which leads to primary cooler 23 and secondary cooler 24 filled with any suitable packing material which causes intermixture of the gas with cooling liquor sprayed into the tops of the coolers in a manner well known in the coke oven art. Cooling liquor flows from the bottom of the coolers through conduits 25 to the decanter 20. The coke oven gas is drawn through the collector main and coolers by any suitable exhauster pump 27 driven in the customary manner by a condensing steam engine 27' discharging exhaust steam through conduit 28 to barometric condenser 29. The barometric condenser is of the conventional type equipped with the usual barometric leg 30, a seal 30', a water inlet 31 supplying cooling water to the water jets of the condenser and suction device 32 for removing noncondensibles from the condenser. Condensation of the steam by the cooling water in the condenser produces a vacuum therein. If desired an engine of lower horse power (than would normally be used in the installation involving the customary saturator) operating at full capacity may be employed to drive the exhauster.

From the exhauster pump 27, the coke oven gas flows through a tar precipitator 33, which may be of the electrical type, to reheater 35 where it is reheated from a temperature of about 25° to between about 35° to 60° C. If the reheated gas contains less than 70 per cent of the amount of moisture required to saturate it, sufficient steam may be mixed with the gas to bring its humidity to from 70 to 100 per cent. Ammonia and steam from the still 12 is introduced into the coke oven gas through conduit 36 communicating with conduit 37 to augment the ammonia content thereof and the coke oven gas containing ammonia is passed upwardly through packed scrubbing column 39 countercurrent to a descending solution at a temperature of from 35° to 65° C. and containing from 10 to 50 grams of sulphuric acid per liter and 40 to 45 per cent by weight of ammonium sulphate. The solution is circulated from tank 40 to sprays 41 at the top of column 39 by pump 42. The coke oven gas substantially free of ammonia is passed from the top of the column through entrained moisture separator 44 equipped with conduit 45 for conducting the moisture removed from the gas to the base of the scrubbing column. The gas then passes through conduit 46, through final cooler 48 and light oil scrubbers 50 where the gas is cooled and scrubbed.

The ammonia present in the gas reacts with the sulphuric acid in the packed scrubbing column 39 to neutralize a portion or substantially all of the acid and produce an ammonium sulphate solution containing from 42 to 47 per cent by weight of ammonium sulphate and from 0 to 15 grams of sulphuric acid per liter. This solution at a temperature of from 50° to 65° C. is pumped by pump 52 from the base of the scrubbing column through the valved conduit 53 and a portion of the solution is discharged through valved conduit 54 into crystallizing chamber 55 of the crystallizing unit, shown diagrammatically in Figure 1 and in more detail in Figure 3. The remainder of the solution, i. e., the portion not passed to the crystallizing unit, is discharged through conduit 79 into mixing tank 40. The portion of the solution introduced into the crystallizing unit is discharged adjacent to pump inlet 57 and is circulated by pump 58 through conduit 59 to evaporative cooling chamber 61 communicating through conduit 62 with the barometric condenser. The vapors from evaporative cooling chamber 61 are condensed, together with steam introduced through conduit 28, in barometric condenser 29. Thus it will be seen the solution is continuously recirculated through the scrubbing column, a portion of the circulating solution being bled off and passed through the crystallizing unit. The barometric condenser maintains the evaporative cooling chamber under relatively high vacuum, e. g., a vacuum of 26 to 28 inches of mercury, whereby the solution is cooled and concentrated by evaporation of water sufficiently to effect supersaturation of the solution with respect to ammonium sulphate. The supersaturated solution passes downwardly through pipe 64 to the bottom of crystallizing chamber 55 and then passes upwardly through the bed or suspension of crystals 66 supported on perforated plate or screen 67. The chamber 61 and pipe 64 form a barometric column. As the supersaturated solution passes over the crystals, ammonium sulphate is crystallized out onto the surfaces of the crystals, thus causing them to increase in size, the larger crystals sinking downwardly toward the plate and the small ones remaining suspended in the solution above the plate. As the crystals reach the desired size, they may be removed continuously or from time to time through conduit 68 equipped with valve 69. The crystals pass through conduit 68 to receptacle 72 from which they are conducted to centrifugal drier 73 and the dried crystals conveyed to storage on conveyor 74.

Liquor practically free from crystalline ammonium sulphate and containing from 44 to 46 per cent by weight of the dissolved salt passes from the crystallizing chamber through overflow opening 76 and conduit 78 to tank 40 where it mingles with the solution introduced through conduit 79. Sufficient sulphuric acid and water are added to the liquor in the tank to bring the ammonium sulphate concentration within the range of from 40 to 45 per cent by weight and its sulphuric acid concentration within the range of 10 to 50 grams per liter. All, or a portion, of the resultant solution is brought within the desired limits in the mixing tank and recirculated by pump 42 through the column 39. Preferably, all of the ammonium sulphate solution from scrubbing column 39 may be passed through valved conduit 54 to crystallizing unit 56 prior to entering the tank 40.

By maintaining the temperature and ammonium sulphate concentration of the solution within the limits hereinabove disclosed, crystal formation in portions of the system other than the crystallizing unit is avoided.

The crystallizing unit illustrated in Figure 4 differs from that of Figure 3 chiefly in that the bottom 79' of the crystallizing chamber is of curved instead of conical shape and the chamber does not involve a perforated plate so that the suspension of crystals is in direct contact with the chamber bottom. Supersaturated ammonium sulphate solution is discharged from pipe 64 at the lower portion of the crystal suspension and agitates the crystals, thus facilitating settling of the larger crystals to the bottom of the crystallizing chamber.

The following example is illustrative of the production of ammonium sulphate in accordance with the invention: coke oven gas from collector main 3, coolers 23 and 24 and tar precipitator 33 is preheated in reheater 35, mixed with ammonia and steam from still 12 and the mixture at a temperature of about 55° C. is introduced into the bottom of scrubbing column 39. A solution at a temperature of about 53° C. containing about 44.7 per cent by weight of ammonium sulphate and about 22 grams per liter of free sulphuric acid is pumped by means of pump 42 from the mixing tank 40 through sprays 41 into the packed scrubbing tower 39 and passes downwardly through the tower countercurrent to the ascending coke oven gas. The ammonia present in the gas reacts with the sulphuric acid in the solution and the solution at a temperature of about 60° C. containing about 45.9 per cent by weight of ammonium sulphate and about 10 grams per liter of free sulphuric acid is pumped from the base of the column by pump 52 and a portion of the solution is passed through valved conduit 54 to the pump inlet 57 of the crystallizing unit, the remainder of the solution passing through valved conduit 79 directly to the mixing tank 40. The solution introduced into the crystallizing unit is cooled and concentrated by evaporative cooling under a vacuum of about 27 inches of mercury in chamber 61 to supersaturate the solution with respec to ammonium sulphate and the supersaturated solution passes through pipe 64 into contact with the bed of crystals 66 in the crystallizing chamber 55. Ammonium sulphate from the solution deposits on the surfaces of the crystals causing them to grow, the larger crystals being removed through pipe 68. Ammonium sulphate liquor at a temperature of about 52° C. containing about 45.7 per cent of ammonium sulphate by weight and about 10 grams per liter of free sulphuric acid passes from the crystallizing chamber through overflow conduit 78 to the tank 40 where it mingles with the solution passed directly from the scrubbing column through conduit 79 to the tank; water and sulphuric acid are added to adjust the ammonium sulphate concentration of the solution in the mixing tank to 44.7 per cent by weight and the sulphuric acid concentration to about 22 grams per liter. The solution is then recirculated from the tank by pump 42 through scrubbing column 39 into contact with additional coke oven gas. In starting the process sulfuric acid solution may be circulated from tank 40 through the scrubber 39 and back to the tank without passing any of the solution to the crystallizing unit until the ammonium sulphate concentration of the solution becomes sufficiently high, e. g., about 45.9 per cent by weight. A part or all of the solution from the scrubber may then be introduced into the crystallizer.

In the embodiment of the invention illustrated in Figure 2, the packed scrubbing tower 39, tank 40 and the crystallizing unit 56 are similar to the corresponding equipment hereinabove described in connection with Figures 1, 3 and 4. In carrying out the invention in accordance with Figure 2, a solution containing from 40 to 45 per cent by weight of ammonium sulphate and from 10 to 35 grams of free sulphuric acid per liter is passed downwardly through packed scrubbing column 39 countercurrent to the coke oven gas containing ammonia so that the ammonia in the gas reacts with the sulphuric acid. The resultant solution is pumped by pump 80 through conduit 81, a portion, or all, of the solution passing into the top of packed scrubbing column 82 and downwardly therethrough countercurrent to ammonia introduced through conduit 83 and the remainder of the solution passing through valved conduit 85 directly to mixing tank 40. The ammonia introduced into column 82 may be obtained from the usual ammonia still (e. g., still 12 of Figure 1) or ammonia from any other desired source may be utilized. The residual sulphuric acid present in the solution is neutralized in column 82, the solution containing from 42 to 47 per cent by weight of ammonium sulphate and substantially no free sulphuric acid is pumped from the bottom of the column by pump 84 to the crystallizing unit 56 and the ammonium sulphate is crystallized out in the form of large size uniform crystals as hereinabove described in connection with Figures 1, 3 and 4. Ammonium sulphate liquor passes through overflow conduit 78 from crystallizing chamber 55 to tank 40 and water and sulphuric acid sufficient to bring the sulphuric acid concentration of the mixed solution in the tank from about 0–5 to 10–25 grams per liter and the ammonium sulphate concentration from about 47–42 to 45–40 per cent by weight are added to the tank and the resultant solution is recirculated by pump 42 to the top of packed scrubbing column 39. The modification of the invention illustrated in Figure 2 has the advantage that the solution of ammonium sulphate introduced into the crystallizing unit contains substantially no free sulphuric acid and the free acid concentration of the solution introduced into column 39 may be less than that employed in connection with Figure 1, thus minimizing the possibility of corrosion of the equipment and permitting the use of equipment less resistant to corrosion by sulphuric acid.

Thus it will be seen that the invention provides a process for the production from coke oven gas of ammonium sulfate crystals of larger and more uniform size at lower cost than could heretofore be accomplished by the saturator process. As hereinabove pointed out, the average dimensions of crystals produced in accordance with the invention are about 1.1 mm. diameter by 1.5 mm. length as compared with crystals of average dimensions of 0.2 mm. diameter by 1.0 mm. length obtained by the saturator process. Furthermore, the ammonium sulphate produced in accordance with the invention is substantially free from very fine crystals present in the saturator product.

Since certain changes in carrying out the invention may be made without departing from its scope, it is intended that the above description should be interpreted as illustrative and not in a limiting sense. For example, while the invention is primarily intended for the production of ammonium sulphate product from coke oven gas, it may be employed in the manufacture of ammonium sulphate from other combustible or inert gases containing ammonia, e. g., producer gas produced from bituminous coal and gaseous mixtures produced by distilling ammonia from solutions thereof and mixing the same with inert gases.

What is claimed is:

1. A process of producing an improved ammonium sulphate product from coke oven gas containing ammonia which comprises passing the gas at a temperature of from 35° to 60° C. and a humidity of at least 70 per cent into a scrubbing column countercurrent to a solution containing from 40 to 45 per cent by weight of ammonium sulphate and from 10 to 50 grams per liter of sulphuric acid whereby the ammonia present in the gas reacts with the sulphuric acid to form ammonium sulphate, withdrawing a portion of the resultant solution, evaporating said portion under vacuum to effect supersaturation thereof with respect to ammonium sulphate, passing the supersaturated solution into contact with a suspension of ammonium sulphate crystals whereby ammonium sulphate is deposited from the solution on the surfaces of the crystals causing them to increase in size, adding sulphuric acid and water to the remainder of the solution to bring its sulphuric acid concentration within the range of from 10 to 50 grams per liter and its ammonium sulphate concentration within the range of 40 to 45 per cent by weight and recirculating the resultant solution at a temperature of from 35° to 65° C. into the scrubbing column into contact with additional coke oven gas.

2. In a process involving drawing coke oven gas through a coke oven collector main and a gas cooler by a gas exhauster driven by a steam engine and forming the gas by the exhauster into contact with a sulphuric acid solution to form ammonium sulphate, the improvement which comprises reheating the gas to a temperature of 35° to 60° C. adjusting its humidity to at least 70 per cent, passing the gas through a scrubbing column in intimate contact with a solution containing sulphuric acid and ammonium sulphate whereby the ammonia present in the gas reacts with the sulphuric acid to form ammonium sulphate, withdrawing the ammonium sulphate solution, evaporating ammonium sulphate solution from the scrubbing column under vacuum to effect supersaturation of the solution with respect to ammonium sulphate, condensing steam exhausted by said engine and vapors produced by evaporation of said solution in a barometric condenser, passing the supersaturated solution into contact with a suspension of ammonium sulphate crystals whereby ammonium sulphate is deposited from the solution on the surfaces of the crystals causing them to increase in size, removing the solution from the suspension of crystals, adding sulphuric acid to the solution and recirculating it through the scrubbing column into contact with additional coke oven gas.

3. A process of producing ammonium sulphate and removing ammonia from coke oven gas which comprises passing the gas into contact with water to form ammonia liquor, freeing ammonia from the liquor, passing the gas through a scrubbing column in intimate contact with a solution containing sulphuric acid and ammonium sulphate whereby the residual ammonia present in the gas reacts with the sulphuric acid to form ammonium sulphate, passing the ammonia freed from the ammonia liquor into another scrubbing column into intimate contact with the solution from the first named column whereby the remaining sulphuric acid present in the solution is neutralized and additional ammonium sulphate is formed, evaporating the resultant ammonium sulphate solution under vacuum to effect supersaturation of the solution with respect to ammonium sulphate, passing the supersaturated solution into contact with a suspension of ammonium sulphate crystals whereby ammonium sulphate is deposited from the solution on the surfaces of the crystals causing them to increase in size, removing the solution from the suspension of crystals, adding sulphuric acid to the solution and recirculating it through the scrubbing columns into contact with additional coke oven gas and ammonia.

4. A process for the production of ammonium sulphate and the removal of ammonia from coke oven gas which comprises passing coke oven gas containing ammonia through a scrubbing column into contact with a solution containing ammonium sulphate and sulphuric acid whereby the ammonia present in the gas reacts with sulphuric acid to form ammonium sulphate, passing the resultant solution through another scrubbing column in intimate contact with ammonia whereby the remaining sulphuric acid in the solution is neutralized and additional ammonium sulphate is formed, evaporating the resultant ammonium sulphate solution under vacuum to effect supersaturation of the solution with respect to ammonium sulphate, passing the supersaturated solution into contact with a suspension of ammonium sulphate crystals whereby ammonium sulphate is deposited from the solution on the surfaces of the crystals causing them to increase in size, removing the solution from the suspension of crystals, adding sulphuric acid to the solution and recirculating it through the scrubbing columns into contact with additional coke oven gas and ammonia.

5. A process of producing an improved ammonium sulphate product from inert gas containing ammonia which comprises preheating the gas to a temperature of 35° to 60° C., adding moisture to the gas to regulate the humidity thereof to at least 70 per cent, intimately contacting the preheated humidified gas with an unsaturated ammonium sulphate solution containing free sulphuric acid whereby the ammonia present in the gas reacts with the sulphuric acid to form additional ammonium sulphate in amount insufficient to supersaturate the solution, withdrawing the resultant ammonium sulphate solution from the zone of the reaction, evaporating the withdrawn solution under vacuum to effect supersaturation of the solution with respect to ammonium sulphate, then passing the supersaturated solution into contact with a suspension of ammonium sulphate crystals, whereby ammonium sulphate is deposited from the solution on the surfaces of the crystals causing them to increase in size, removing the solution from the suspension of crystals and recirculating the solution together with additional free sulphuric acid into intimate contact with additional preheated humidified inert gas containing ammonia.

6. A process of producing an improved ammonium sulphate product from coke oven gas containing ammonia which comprises preheating the gas to a temperature of 35° to 60° C., adding moisture to the gas to regulate the humidity thereof to at least 70 per cent, passing the preheated humidified coke oven gas into intimate contact with an unsaturated ammonium sulphate solution containing free sulphuric acid whereby the ammonia present in the gas reacts with the sulphuric acid to form additional ammonium sulphate in amount insufficient to supersaturate the solution, withdrawing the resultant ammonium sulphate solution from the zone of the reaction, evaporating the withdrawn solution under vacuum to effect supersaturation of the solution with respect to ammonium sulphate, then passing the supersaturated solution into contact with a suspension of ammonium sulphate crystals whereby ammonium sulphate is deposited from the solution on the surfaces of the crystals causing them to increase in size, removing the solution from the suspension of crystals and recirculating the solution together with additional sulphuric acid into contact with additional preheated humidified coke oven gas.

7. In a process involving drawing coke oven gas through a coke oven collector main and a gas cooler by a gas exhauster driven by a steam engine and forcing the gas by the exhauster into contact with a sulphuric acid solution to form ammonium sulphate, the improvement which comprises preheating the gas to a temperature of from 35° to 60° C., regulating the humidity of the gas to at least 70 per cent, passing the preheated, humidified gas into a scrubbing column countercurrent to an unsaturated ammonium sulphate solution containing free sulphuric acid whereby the ammonia present in the gas reacts with the sulphuric acid to form additional ammonium sulphate in amount insufficient to supersaturate the solution, withdrawing the solution from the column, evaporating the withdrawn solution under vacuum to effect supersaturation of the solution with respect to ammonium sulphate, passing the supersaturated solution into contact with a suspension of ammonium sulphate crystals whereby ammonium sulphate is deposited from the solution on the surfaces of the crystals causing them to increase in size, removing the solution from the suspension of crystals, adding free sulphuric acid and water to the solution to increase its sulphuric acid concentration and reduce its ammonium sulphate concentration and recirculating the resultant solution containing ammonium sulphate and free sulphuric acid into the scrubbing column into contact with additional preheated humidified coke oven gas.

8. A process of producing ammonium sulphate from coke oven gas containing ammonia, which comprises heating and adding moisture to the gas to raise its temperature to within the range of 35° to 60° C. and its humidity to at least 70 per cent, passing the heated and humidified gas upwardly through a scrubbing column countercurrent to an unsaturated ammonium sulphate solution containing free sulphuric acid whereby the ammonia present in the gas reacts with the sulphuric acid and forms additional ammonium sulphate, the amount of ammonium sulphate formed by said reaction being insufficient to supersaturate the solution in the column, withdrawing the resultant solution of ammonium sulphate from the column, evaporating at least a portion of the withdrawn solution under vacuum sufficiently to effect supersaturation with respect to ammonium sulphate, passing the supersaturated solution into contact with ammonium sulphate crystals whereby ammonium sulphate is deposited on the crystals causing them to increase in size, removing the solution from the crystals and recirculating it together with additional sulphuric acid and water into contact with additional preheated humidified coke oven gas.

9. In a process involving withdrawing coke oven gas containing ammonia through a coke oven collector main and a gas cooler by a gas exhauster and forcing the gas by the exhauster into contact with a sulphuric acid solution to form ammonium sulphate, the improvement which comprises preheating the gas to a temperature of from 35° to 60° C., adding sufficient moisture to the gas to substantially saturate it with water vapor, passing the preheated substantially saturated gas through a scrubbing column countercurrent to an unsaturated ammonium sulphate solution containing free sulphuric acid in excess of the amount required to react with the ammonia present in the gas, the amount of ammonium sulphate formed in the scrubbing column being insufficient to supersaturate the solution in said column, withdrawing the resultant solution of ammonium sulphate containing free sulphuric acid from said scrubbing column, evaporating at least a portion from the withdrawn solution under vacuum sufficiently to effect supersaturation with respect to ammonium sulphate, passing the supersaturated solution into contact with a suspension of ammonium sulphate crystals whereby ammonium sulphate is deposited from the solution on the crystals causing them to increase in size, removing the solution from the crystals, adding free sulphuric acid and water to the solution to increase its sulphuric acid concentration and reduce its ammonium sulphate concentration and recirculating the resultant solution containing ammonium sulphate and free sulphuric acid into the scrubbing tower into contact with additional coke oven gas containing ammonia.

10. A process of producing an improved ammonium sulphate product from inert gas containing ammonia which comprises preheating the gas to a temperature of 35° to 60° C., adding moisture to the gas to regulate the humidity thereof to at least 70 per cent, contacting the preheated, humidified gas in a scrubbing column with an unsaturated ammonium sulphate solution containing free sulphuric acid, whereby the ammonia present in the gas reacts with the sulphuric acid to form additional ammonium sulphate in amount insufficient to supersaturate the solution, withdrawing the resultant ammonium sulphate solution from the column, evaporating the withdrawn solution under vacuum to effect supersaturation of the solution with respect to ammonium sulphate, then passing the supersaturated solution into contact with a suspension of ammonium sulphate crystals, whereby ammonium sulphate is deposited from the solution on the surfaces of the crystals, causing them to increase in size, removing the solution from the suspension of crystals, and recirculating the solution together with additional free sulphuric acid through the scrubbing column into contact with additional preheated, humidified, inert gas containing ammonia.

WILLIAM TIDDY.

---

CERTIFICATE OF CORRECTION.

Patent No. 2,368,901.   February 6, 1945.

WILLIAM TIDDY.

It is hereby certified that error appears in the printed specification of the above numbered patent requiring correction as follows: Page 4, second column, line 46, claim 2, for the word "forming" read --forcing--; and that the said Letters Patent should be read with this correction therein that the same may conform to the record of the case in the Patent Office.

Signed and sealed this 15th day of May, A. D. 1945.

Leslie Frazer
Acting Commissioner of Patents.

(Seal)

effect supersaturation with respect to ammonium sulphate, passing the supersaturated solution into contact with ammonium sulphate crystals whereby ammonium sulphate is deposited on the crystals causing them to increase in size, removing the solution from the crystals and recirculating it together with additional sulphuric acid and water into contact with additional preheated humidified coke oven gas.

9. In a process involving withdrawing coke oven gas containing ammonia through a coke oven collector main and a gas cooler by a gas exhauster and forcing the gas by the exhauster into contact with a sulphuric acid solution to form ammonium sulphate, the improvement which comprises preheating the gas to a temperature of from 35° to 60° C., adding sufficient moisture to the gas to substantially saturate it with water vapor, passing the preheated substantially saturated gas through a scrubbing column countercurrent to an unsaturated ammonium sulphate solution containing free sulphuric acid in excess of the amount required to react with the ammonia present in the gas, the amount of ammonium sulphate formed in the scrubbing column being insufficient to supersaturate the solution in said column, withdrawing the resultant solution of ammonium sulphate containing free sulphuric acid from said scrubbing column, evaporating at least a portion from the withdrawn solution under vacuum sufficiently to effect supersaturation with respect to ammonium sulphate, passing the supersaturated solution into contact with a suspension of ammonium sulphate crystals whereby ammonium sulphate is deposited from the solution on the crystals causing them to increase in size, removing the solution from the crystals, adding free sulphuric acid and water to the solution to increase its sulphuric acid concentration and reduce its ammonium sulphate concentration and recirculating the resultant solution containing ammonium sulphate and free sulphuric acid into the scrubbing tower into contact with additional coke oven gas containing ammonia.

10. A process of producing an improved ammonium sulphate product from inert gas containing ammonia which comprises preheating the gas to a temperature of 35° to 60° C., adding moisture to the gas to regulate the humidity thereof to at least 70 per cent, contacting the preheated, humidified gas in a scrubbing column with an unsaturated ammonium sulphate solution containing free sulphuric acid, whereby the ammonia present in the gas reacts with the sulphuric acid to form additional ammonium sulphate in amount insufficient to supersaturate the solution, withdrawing the resultant ammonium sulphate solution from the column, evaporating the withdrawn solution under vacuum to effect supersaturation of the solution with respect to ammonium sulphate, then passing the supersaturated solution into contact with a suspension of ammonium sulphate crystals, whereby ammonium sulphate is deposited from the solution on the surfaces of the crystals, causing them to increase in size, removing the solution from the suspension of crystals, and recirculating the solution together with additional free sulphuric acid through the scrubbing column into contact with additional preheated, humidified, inert gas containing ammonia.

WILLIAM TIDDY.

---

CERTIFICATE OF CORRECTION.

Patent No. 2,368,901.  February 6, 1945.

WILLIAM TIDDY.

It is hereby certified that error appears in the printed specification of the above numbered patent requiring correction as follows: Page 4, second column, line 46, claim 2, for the word "forming" read --forcing--; and that the said Letters Patent should be read with this correction therein that the same may conform to the record of the case in the Patent Office.

Signed and sealed this 15th day of May, A. D. 1945.

Leslie Frazer
Acting Commissioner of Patents.

(Seal)